June 24, 1969     W. F. JONES     3,451,157
FISHHOOK REMOVER
Filed Nov. 23, 1966
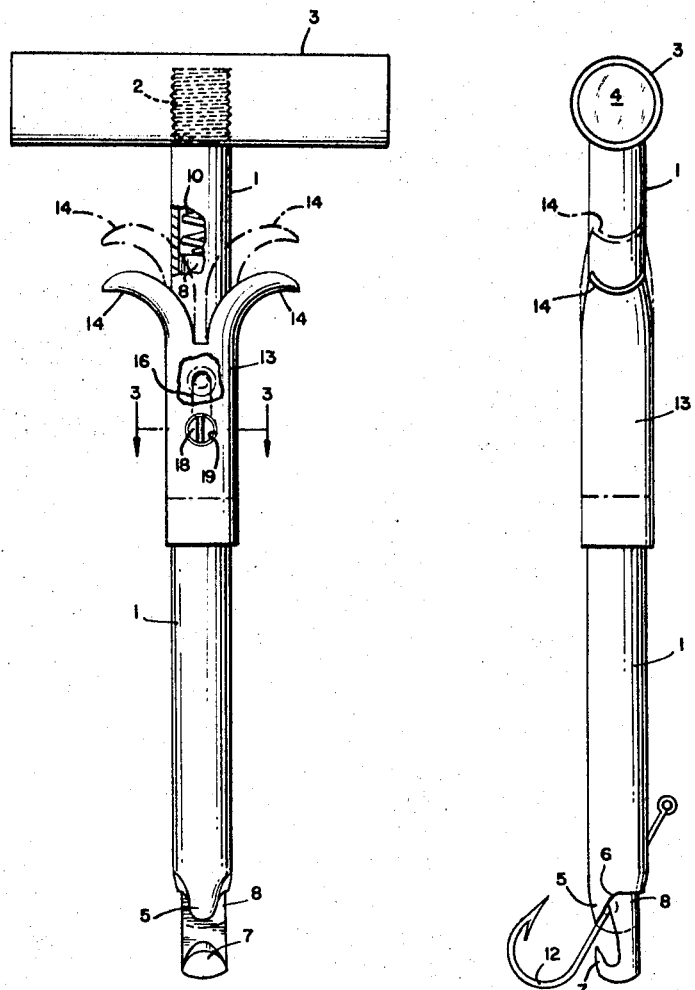
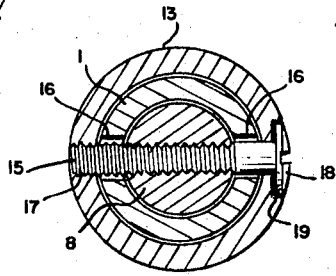
WILLIAM F. JONES
INVENTOR.
BY James D. Givnan
ATT'Y

United States Patent Office 3,451,157
Patented June 24, 1969

3,451,157
FISHHOOK REMOVER
William F. Jones, 2800 SE. 92nd Ave.,
Portland, Oreg. 97266
Filed Nov. 23, 1966, Ser. No. 596,691
Int. Cl. A01k 97/00
U.S. Cl. 43—53.5                1 Claim

ABSTRACT OF THE DISCLOSURE

A device for removing a fishhook from the mouth of a fish includes a main tubular member having a crosswise handle secured at one of its ends. Interiorly of the tubular member is a slidable rod which is operable by a manually operable sleeve carried exteriorly on said tubular member and which upon movement of the sleeve causes hook engaging elements on said tubular member and said rod to close about the fishhook to be removed.

---

This invention relates to improvements in fishhook removers and has for its principal object the provision of a device which is of simple, efficient, durable, inexpensive construction, especially designed for quickly and conveniently disengaging fishhooks of a wide range of sizes from the mouth, throat, gullet or stomach of a caught fish with a minimum amount of mutilation.

Another object of the invention is the provision of a device of this character involving a minimum number of parts, rendering the device foolproof in operation and including a weighted handle at one end thereof to serve as a hammer for killing the fish soon after being caught.

The foregoing and other objects and advantages which will become subsequently apparent reside in the details of construction and operation as more fully hereinafter described and claimed, reference being had to the accompanying drawing forming a part hereof and in which:

FIGURE 1 is an elevational view of a fishhook remover made in accordance with my invention and with fragments broken away for convenience of illustration.

FIGURE 2 is a side elevational view of FIGURE 1, and

FIGURE 3 is a sectional plan view on an enlarged scale taken approximately along the line 3—3 of FIGURE 1.

Referring now more particularly to the drawing wherein like reference characters designate like parts, reference numeral 1 indicates the main body of the device in the form of a hollow tubular member externally threaded as at 2 at one of its ends for threaded securement to a hollow tubular handle 3. The handle may be filled with lead or the like, as indicated at 4 to give it added weight or, if desired, it may be made of solid metal.

The opposite end of the tubular member 1 is provided with a projection 5 undercut as at 6 for cooperation with the hook-shaped end 7 of a rod 8 slidably mounted within the tubular member 1 and normally held in the extended position shown by a compression spring 10 whose one end bears against the handle 3 with its opposite end bearing against the top of the rod 8.

For pulling the rod 8 upwardly from the full line open position shown into gripping engagement with a fishhook 12, I provide a sleeve 13 slidably mounted upon the main body 1, and bifurcated at its top end to provide two outwardly bent fingergrips 14. As best illustrated in FIGURE 3, sleeve 13 is secured to the rod 8 by a bolt 15 slidably extending through two diametrically opposed slots 16 in the tubular member 1 and threadedly secured as at 17 at one of its ends to the sleeve. The opposite end of bolt 15 is provided with a truss-head 18 seated within an accommodating recess 19 in the sleeve 13 with the exposed surface of the head smoothly conforming with the circumferential surface of the sleeve.

By this arrangement the sleeve 13 presents a smooth cylindrical surface substantially throughout its length.

The handle 3 is preferably, though not restrictively, of hollow tubular form and weighted with a filler of lead or the like as aforesaid for use as a hammer for killing a landed fish.

In operating the device it is merely necessary to grip the handle 3 with one hand and the fingergrips 14 with the fingers which when drawn upwardly in a normal gripping position will pull the rod 8 upwardly to grip the shank of the fishhook 12 between the hook 7 at the end of rod 8 and the undercut 6 of the projection 5 whereby the hook will be securely held during manipulation of the device to free the hook.

Having thus described my invention, what I claim as new and desire to protect by Letters Patent is:

1. A fishhook removing device comprising in combination,
   an elongated hollow tubular member having a handle at one of its ends and fishhook engaging means at its opposite end and provided with a pair of diametrically opposed elongated slots,
   a rod slidably carried within said tubular member and terminating in a hook at one of its ends for cooperation with said fishhook engaging means at the end of said tubular member,
   resilient means interposed between the opposite end of said rod and said handle normally holding said hook and fishhook engaging means in open relation to each other,
   sleeve means slidably mounted on said tubular member and bifurcated with outwardly curved bends at one of its ends to provide fingergrips, and
   a fastening element extending diametrically through said sleeve means, said slots in said tubular member and said rod to fasten the latter to said sleeve for positive simultaneous movement of said rod and sleeve means.

References Cited

UNITED STATES PATENTS 2,688,816   9/1954   Bondesen _____ 43—53.5
2,885,240   5/1959   Andrews.

SAMUEL KOREN, *Primary Examiner.*

DANIEL J. LEACH, *Assistant Examiner.*